(12) United States Patent
Ebert et al.

(10) Patent No.: US 6,706,797 B1
(45) Date of Patent: Mar. 16, 2004

(54) POLYCARBONATE MOLDING COMPOUNDS WITH GOOD DEMOLDING PROPERTIES AND MOLDED BODIED AND SEMIFINISHED PRODUCTS PRODUCED FROM THE SAME

(75) Inventors: Wolfgang Ebert, Krefeld (DE); Ralf Kaufmann, Duisburg (DE); Christoph Schwemler, League City, TX (US); Wilfried Haese, Odenthal (DE); Peter Fischer, Köln (DE); Martin Döbler, Düsseldorf (DE); Joachim Genz, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/030,843

(22) PCT Filed: Jul. 3, 1999

(86) PCT No.: PCT/EP00/06178

§ 371 (c)(1),
(2), (4) Date: Jan. 9, 2002

(87) PCT Pub. No.: WO01/04199

PCT Pub. Date: Jan. 18, 2001

(30) Foreign Application Priority Data

Jul. 13, 1999 (DE) .......................... 199 32 170

(51) Int. Cl.$^7$ .............................. C08L 69/00; C08K 5/01
(52) U.S. Cl. .................... 524/490; 524/483; 525/146
(58) Field of Search ................. 524/483, 490; 525/146

(56) References Cited

U.S. PATENT DOCUMENTS

| | | | |
|---|---|---|---|
| 3,751,519 A | 8/1973 | Bostick et al. | 260/824 |
| 3,957,664 A | * 5/1976 | Heilman | |
| 4,390,651 A | 6/1983 | Brown, Jr. | 524/267 |
| 4,399,251 A | 8/1983 | Lee | 524/481 |
| 4,415,696 A | 11/1983 | Mark | 524/490 |
| 4,425,458 A | 1/1984 | Lindner et al. | 524/314 |
| 4,446,268 A | 5/1984 | Lee | 524/315 |
| 4,536,590 A | 8/1985 | Brown, Jr. | 556/453 |
| 4,626,566 A | * 12/1986 | Miller | |
| 5,001,180 A | 3/1991 | Lundy et al. | 524/314 |
| 5,018,828 A | 5/1991 | Ohdaira et al. | 350/96.34 |
| 5,210,124 A | 5/1993 | Hovatter et al. | 524/311 |
| 5,484,874 A | 1/1996 | Ishiwa et al. | 528/196 |
| 5,744,626 A | 4/1998 | O'Lenick, Jr. | 554/227 |

FOREIGN PATENT DOCUMENTS

| | | |
|---|---|---|
| DE | 33 12 158 | 10/1983 |
| EP | 0 100 918 | 2/1984 |
| EP | 0 352 458 | 1/1990 |
| EP | 0 230 015 | 7/1992 |
| EP | 0 699 713 | 3/1996 |
| EP | 0 561 630 | 12/1999 |

* cited by examiner

*Primary Examiner*—David J. Buttner
(74) *Attorney, Agent, or Firm*—Joseph C. Gil; Aron Preis; Gary F. Matz

(57) ABSTRACT

A thermoplastic molding composition comprising polycarbonate resin having improved mold release properties is disclosed the composition contain polycarbonate resin and 0.005 to 5.0% relative to the weight of the composition of at least one hydrocarbon in the form of $C15_{-600}$-methyl-branched alkane. The hydrocarbon is characterized in that the weight proportion of its branches is 5 to 30 percent relative to the weight of carbons in the alkane chain.

16 Claims, No Drawings

POLYCARBONATE MOLDING COMPOUNDS WITH GOOD DEMOLDING PROPERTIES AND MOLDED BODIED AND SEMIFINISHED PRODUCTS PRODUCED FROM THE SAME

The present invention provides polycarbonate moulding compositions with good release properties having methyl-branched alkanes or alkane mixtures as release agents, optionally in addition to other conventional polycarbonate additives.

There are numerous patents and publications describing the releasing action of additives in thermoplastics in general and in polycarbonate in particular. The substances most commonly used as release agents are the esters of long-chain aliphatic acids and alcohols. The use of esters of fatty acid alcohols or polyols, such as e.g. pentaerythritol with fatty acids, such as are described in DE 33 12 158, EP 100 918, EP 103 107, EP 561 629, EP 352 458, EP 436 117, or, using guerbet alcohols, U.S. Pat. No. 5,001,180, DE 33 12 157, U.S. Pat. No. 5,744,626, is mentioned here by way of example. All of these esters have the disadvantage that they have a tendency towards interesterification with the polycarbonate due to impurities having a catalytic effect and to the processing temperature. This becomes particularly apparent at the high melt temperatures necessary for short cycle times.

Other release agents that do not have this disadvantage, such as long-chain ketones, tend to form chromophores due to self-condensation and are poorly accessible (EP 100 918).

Siloxanes, which are likewise used (U.S. Pat. No. 4,536,590, U.S. Pat. No. 4,390,651, U.S. Pat. No. 3,751,519), possess an adequate temperature resistance but are very poorly compatible with polycarbonate and in the concentrations required to be effective they lead to haze.

α-olefin polymers (EP 561 630, EP 230 015) with residual double bonds (DE 32 44 499) are not colourfast and in the case of hydrogenated systems, as with the long-chain alkanes (U.S. Pat. No. 4,415,696), there is a compatibility problem with polycarbonate, and the wax-like, often partially liquid partially waxy consistency of these products is restricting.

Warp-free demoulding of polycarbonate mouldings with no deterioration in the very high-grade surface represents an ever greater challenge due to the demands for shorter cycle times and higher processing temperatures at a time when shapes are becoming ever more complex. Many problems can commonly be overcome only with a tailor-made release agent formulation. There is therefore a continual need for new potential release agents. The object was therefore to find release agents that do not tend towards interesterification with the polycarbonate nor form deposits on the mould and that do not lead to haze or discoloration in the effective concentrations.

The object was therefore to develop a readily releasing moulding composition which in addition to outstanding mould release properties and transparency also has satisfactory temperature resistance without discoloration or interesterification.

The object was achieved by the use of methyl-branched alkanes which have an adequate solubility and stability in polycarbonate.

The present invention provides polycarbonate moulding compositions containing hydrocarbons having 15 to 600 carbon atoms, whereby these hydrocarbons are contained in quantities of 0.005 to 5.0 wt. % relative to the weight of the entire moulding composition, and these hydrocarbons consist of methyl-branched alkane chains, whereby they display a proportion by weight of branches of between 5 wt. % and 30 wt. % relative to the carbons in the chain.

The preferred content of hydrocarbons is 0.01 to 2.0 wt. %, most particularly preferably 0.02 to 1.0 wt. %.

Hydrocarbons having 15 to 100 carbon atoms are likewise preferred, with those having 15 to 40 carbon atoms being particularly preferred.

The hydrocarbons according to the invention particularly preferably consist of alkanes, of which the carbons in the branching methyl groups have a proportion by weight relative to the carbons in the chain of between 10 wt. % and 30 wt. %; particularly preferred are those constituted from isoprene units, in this case before hydrogenation, particularly preferably from over 90% hydrogenated isoprene units, most particularly preferably from over 95% hydrogenated isoprene units, optionally using comonomers, particularly 2,3-dimethyl butadiene, butadiene, propene and/or isobutene, in the range from 0 to 50 mol % (relative to the isoprene units), but particularly those that are formally constituted from isoprene units before saturation of the double bonds, whereby those containing 15, 20, 25, 30, 35 or 40 C atoms or mixtures thereof are preferred, squalane (30 C atoms) being most particularly preferred.

The polycarbonate moulding compositions can optionally be supplemented with other additives conventionally used in polycarbonate, such as e.g. heat stabilisers, UV/IR stabilisers, other release agents, flame ratardants, antidripping agents, lubricants, flow promoters, fillers, colorants such as pigments or colour concentrates, glass fibres, fillers and blend components such as ABS, SAN, EPDM or polyesters based on terephthalic acid and diols.

The moulding compositions according to the invention can be contaminated with impurities contained in the individual components of the moulding composition due to their synthesis, working up, processing and storage, together with contamination originating during production or processing of the moulding compositions according to the invention. The aim is to work with products that are as clean as possible, however.

Alkanes according to the invention are those of natural or synthetic origin having lateral methyl groups and a total of 15 to 600 carbon atoms, preferably 15 to 100 carbon atoms, whereby the patent also provides mixtures of these hydrocarbons. Hydrocarbons are preferred which are constituted formally or by actual synthesis of 50 to 100 mol % of isoprene units, i.e. which contain this $C_5$ unit after saturation of the double bonds remaining after polymerisation, with the proviso that the carbons in the branching methyl groups have a proportion by weight, relative to the carbons in the chain, of between 10 wt. % and 30 wt. %, preferably between 10 wt. % and 30 wt. %. Comonomers such as can be used in addition to isoprene are those such as are conventionally used in rubber production and polyolefin chemistry, particularly 2,3-dimethyl butadiene, butadiene, propene and/or isobutene. Such saturated aliphatics that arise purely mathematically from isoprene via "head-head" or "head-tail" linkage before saturation of the remaining double bonds are particularly preferred, whereby both linkage types can also occur side by side, particularly squalane.

Mixtures of the hydrocarbons according to the invention can also be used, optionally with admixtures of other alkanes, including linear types, of between 0 and 30 wt. % relative to the amount of alkanes according to the invention.

The alkanes used should have the lowest possible residues of double bonds; iodine values of below 10, ideally below 5, are desirable.

The alkanes according to the invention are commercial and can be acquired in the chemicals trade.

Thermoplastic, aromatic polycarbonates in the sense of the present invention are both homopolycarbonates and copolycarbonates; the polycarbonates can be linear or branched by known means.

Part, up to 80 mol %, preferably from 20 mol % to 50 mol %, of the carbonate groups in the polycarbonates that are suitable according to the invention can be replaced by aromatic dicarboxylic acid ester groups. Such polycarbonates, which contain both acid radicals of the carbonic acid and acid radicals of aromatic dicarboxylic acids incorporated into the molecular chain, are, strictly speaking, aromatic polyester carbonates. For the sake of simplicity they are subsumed under the generic term of thermoplastic, aromatic polycarbonates in the present application.

The polycarbonates for use according to the invention are produced by known means from diphenols, carbonic acid derivatives, optionally chain terminators and optionally branching agents, whereby a part of the carbonic acid derivatives is replaced by aromatic dicarboxylic acids or derivatives of dicarboxylic acids in order to produce the polyester carbonates, depending on the carbonate structural units in the aromatic polycarbonates to be replaced by aromatic dicarboxylic acid ester structural units.

Details concerning the production of polycarbonates have been set down in hundreds of patent specifications over the last 40 years or so. Reference is made here by way of example only to Schnell, "Chemistry and Physics of Polycarbonates", Polymer Reviews, Volume 9, Interscience Publishers, New York, London, Sydney 1964;

D. C. Prevorsek, B. T. Debona and Y. Kesten, Corporate Research Center, Allied Chemical Corporation, Morristown, N.J. 07960: "Synthesis of Poly(ester Carbonate) Copolymers" in Journal of Polymer Science, Polymer Chemistry Edition, Vol. 19, 75–90 (1980);

D. Freitag, U. Grigo, P. R. Müller, N. Nouvertne', BAYER AG, "Polycarbonates" in Encyclopedia of Polymer Science and Engineering, Volume 11, Second Edition, 1988, pages 648–718 and finally Drs U. Grigo, K. Kircher and P. R. Müller "Polycarbonate" in Becker/Braun, Kunststoff-Handbuch, Volume 3/1, Polycarbonate, Polyacetale, Polyester, Celluloseester, Carl Hanser Verlag Munich, Vienna, 1992, pages 117–299.

The thermosplastic polycarbonates including the thermoplastic, aromatic polyester carbonates have average molecular weights Mw (obtained by measuring the relative viscosity at 25° C. in $CH_2Cl_2$ and at a concentration of 0.5 g per 100 ml $CH_2Cl_2$) of 12,000 to 120,000, preferably 15,000 to 80,000 and particularly 15,000 to 60,000.

Suitable diphenols for production of the polycarbonates for use according to the invention are, for example, hydroquinone, resorcinol, dihydroxydiphenyl, bis (hydroxyphenyl) alkanes, bis(hydroxyphenyl) cycloalkanes, bis(hydroxyphenyl) sulfides, bis(hydroxyphenyl) ethers, bis (hydroxyphenyl) ketones, bis(hydroxyphenyl) sulfones, bis (hydroxyphenyl) sulfoxides, α,α'-bis(hydroxyphenyl) diisopropyl benzenes, and ring-alkylated and ring-halogenated compounds thereof.

Preferred diphenols are 4,4'-dihydroxydiphenyl, 2,2-bis (4-hydroxyphenyl)-1-phenylpropane, 1,1-bis(4-hydroxyphenyl) phenyl ethane, 2,2-bis(4-hydroxyphenyl) propane, 2,4-bis(4-hydroxyphenyl)-2-methyl butane, 1,1-bis (4-hydroxyphenyl)-m/p diisopropyl benzene, 2,2-bis(3-methyl-4-hydroxyphenyl) propane, bis(3,5-dimethyl-4-hydroxyphenyl) methane, 2,2-bis(3,5-dimethyl-4-hydroxyphenyl) propane, bis(3,5-dimethyl-4-hydroxyphenyl) sulfone, 2,4-bis(3,5-dimethyl-4-hydroxyphenyl)-2-methyl butane, 1,1-bis(3,5-dimethyl-4-hydroxyphenyl)-m/p-diisopropyl benzene, 2,2- and 1,1-bis (4-hydroxyphenyl)-3,3,5-trimethyl cyclohexane.

Particularly preferred diphenols are 4,4'-dihydroxydiphenyl, 1,1-bis(4-hydroxyphenyl) phenyl ethane, 2,2-bis(4-hydroxyphenyl) propane, 2,2-bis(3,5-dimethyl-4-hydroxyphenyl) propane, 1,1-bis(4-hydroxyphenyl) cyclohexane, 1,1-bis(4-hydroxyphenyl)-m/p-diisopropyl benzene and 1,1-bis(4-hydroxyphenyl)-3,3,5-trimethyl cyclohexane.

These and other suitable diphenols are described in, for example, U.S. Pat. Nos. 3,028,635, 2,999,835, 3,148,172, 2,991,273, 3,271,367, 4,982,014 and 2,999,846, in German laid-open applications 1 570 703, 2 063 050, 2 036 052, 2 211 956 and 3 832 396, French patent specification 1 561 518, in the monograph "H. Schnell, Chemistry and Physics of Polycarbonates, Interscience Publishers, New York 1964" and in the Japanese laid-open applications 62039/1986, 62040/1986 and 105550/1986.

In the case of homopolycarbonates only one diphenol is used, in the case of copolycarbonates several diphenols are used, whereby the bisphenols used, like all other chemicals and auxiliary substances added to the synthesis, can of course be contaminated with impurities originating from their own synthesis, although it is desirable to work with the cleanest possible raw materials.

Suitable chain terminators are both monophenols and monocarboxylic acids. Suitable monophenols are phenol, alkyl phenols such as cresols, p-tert.-butyl phenol, p-n-octyl phenol, p-iso-octyl phenol, p-n-nonyl phenol and p-isononyl phenol, halophenols such as p-chlorophenol, 2,4-dichlorophenol, p-bromophenol and 2,4,6-tribromophenol, or mixtures thereof.

Suitable monocarboxylic acids are benzoic acid, alkyl benzoic acids and halobenzoic acids.

Preferred chain terminators are the phenols having the formula (I)

$$R^6\text{—Ph—OH} \tag{I}$$

where $R^6$ stands for H or a branched or unbranched $C_1$–$C_{18}$ alkyl radical.

The quantity of chain terminators to be used is 0.5 mol % to 10 mol %, relative to moles of diphenols used in each case. The chain terminators can be added before, during or after phosgenation.

Suitable branching agents are the trifunctional or more than trifunctional compounds known in polycarbonate chemistry, particularly those having three or more than three phenolic OH groups.

Suitable branching agents are, for example, phloroglucinol, 4,6-dimethyl-2,4,6-tri(4-hydroxyphenyl) heptene-2,4,6-dimethyl-2,4,6-tri(4-hydroxyphenyl) heptane, 1,3,5-tri(4-hydroxyphenyl) benzene, 1,1,1-tri(4-hydroxyphenyl) ethane, tri(4-hydroxyphenyl) phenyl methane, 2,2-bis[4,4-bis(4-hydroxyphenyl) cyclohexyl] propane, 2,4-bis(4-hydroxyphenyl isopropyl) phenol, 2,6-bis(2-hydroxy-5'-methylbenzyl)-4-methylphenol, 2-(4-hydroxyphenyl)-2-(2,4-dihydroxyphenyl) propane, hexa(4-(4-hydroxyphenyl isopropyl) phenyl) orthoterephthalic acid ester, tetra(4-hydroxyphenyl) methane, tetra(4-(4-hydroxyphenyl isopropyl) phenoxy) methane and 1,4-bis(4', 4"-dihydroxytriphenyl) methyl) benzene, as well as 2,4-dihydroxybenzoic acid, trimesic acid, cyanuric chloride and 3,3-bis(3-methyl-4-hydroxyphenyl)-2-oxo-2,3-dihydroindole.

The quantity of branching agents optionally to be used is 0.05 mol % to 2.5 mol %, relative again to moles of diphenols used in each case.

The branching agents can either be included with the diphenols and chain terminators in the aqueously alkaline phase or added ahead of phosgenation dissolved in an organic solvent.

All these measures for producing polycarbonates are familiar to the person skilled in the art.

Suitable aromatic dicarboxylic acids for production of the polyester carbonates are, for example, phthalic acid, terephthalic acid, isophthalic acid, tert.-butyl isophthalic acid, 3,3'-diphenyl dicarboxylic acid, 4,4'-diphenyl dicarboxylic acid, 4,4-benzophenone dicarboxylic acid, 3,4'-benzophenone dicarboxylic acid, 4,4'-diphenyl ether dicarboxylic acid, 4,4'-diphenyl sulfone dicarboxylic acid, 2,2-bis(4-carboxyphenyl) propane, trimethyl-3-phenyl indane-4,5'-dicarboxylic acid.

Of the aromatic dicarboxylic acids, terephthalic acid and/or isophthalic acid are particularly preferably used.

Derivatives of dicarboxylic acids are the dicarboxylic acid dihalides and the dicarboxylic acid dialkyl esters, particularly the dicarboxylic acid dichlorides and the dicarboxylic acid methyl esters.

The carbonate groups are replaced by the aromatic dicarboxylic acid ester groups substantially stoichiometrically and also quantitatively, such that the molar ratio of the reaction partners is also found in the final polyester carbonate. The aromatic dicarboxylic acid ester groups can be incorporated both randomly and in blocks.

Preferred production methods for the polycarbonates for use according to the invention, including the polyester carbonates, are the known interfacial method and the known melt interesterification method.

Phosgene is preferably used as carbonic acid derivative in the first case, diphenyl carbonate in the second case. Catalysts, solvents, working up, reaction conditions, etc., for polycarbonate production are adequately described and known in both cases.

The moulding compositions according to the invention are produced by adding the alkanes according to the invention to the melt during synthesis or in the case of the phase interfacial process to one of the working up or concentration steps, or alternatively in solution by adding the alkanes according to the invention and optionally other additives simultaneously or successively to the polycarbonates dissolved in a polycarbonate solvent and then evaporating off the polycarbonate solvent.

The present invention therefore also provides a process for the production of the polycarbonate moulding compositions according to the invention, characterised in that polycarbonates are mixed with the alkanes according to the invention either simultaneously or successively, either in bulk or in solution, and the mixtures are then either melt compounded at temperatures of between 260° C. and 360° C. or melt extruded at temperatures of between 250° C. and 320° C. or the polycarbonate solutions are evaporated and the mixture obtained then pelletised.

The polycarbonate moulding compositions according to the invention can also contain the conventional additives, such as glass fibres, fillers, pigments, UV and heat stabilisers, antioxidants and other release agents in the conventional quantities for thermoplastic polycarbonates.

Suitable glass fibres are all commercial grades and types of glass fibers, in other words chopped strands and milled fibres, provided that they are treated by suitable means to make them compatible with polycarbonates.

The glass fibres used to produce the moulding compositions are made from low-alkali glass. According to DIN 1259 low-alkali glass is an aluminium-boron-silicate glass with an alkali oxide content of below 1 wt. %. Glass fibres having a diameter of 8 to 20 $\mu$m and a length of 3 to 6 mm (chopped strands) are conventionally used. Milled fibres can also be used, as can suitable glass beads.

Flame retardants such as are used e.g. in polycarbonate and can also be used in the moulding compositions according to the invention are alkali salts of organic and inorganic acids, particularly sulfonic acids such as e.g. sodium or potassium perfluorobutane sulfonate, potassium hexafluoroaluminate, sodium hexafluoroaluminate, potassium diphenylsulfone sulfonate, sodium-2-formylbenzene sulfonate, sodium (N-benzene sulfonyl) benzene sulfonamide, often in combination with other flame retardants such as halogenated organic compounds, cryolite and Teflon. Mixtures of the cited additives are likewise suitable.

These conventional additives can be added by known means to the polycarbonates to be rendered flame resistant, either together with the components according to the invention or afterwards.

The polycarbonate moulding compositions according to the invention can be processed into moulding on the conventional processing machines by known methods under the conventional processing parameters for polycarbonate.

The invention therefore also provides parts such as mouldings and semi-finished products made from the moulding compositions according to the invention.

The mouldings are used for example in the electrical, electronics, lighting, computer, construction, automotive and/or aviation sector.

The invention therefore also provides the injection moulded and extruded articles produced from them, such as e.g. optical data stores, such as CDs, DVDs and developments thereof, films, sheets, twin-wall sheets, lamps, housings for electrical appliances, computers or motor vehicle equipment such as discs and headlamp diffusers, instrument panel components, trim and the like, particularly transparent applications such as CDs, DVDs and developments thereof, films, sheets, twin-wall sheets, lamps, or motor vehicle equipment such as discs and headlamp diffusers, particularly optical data stores, such as CDs, DVDs and developments thereof.

EXAMPLES

The quantities specified in the examples, expressed in wt. %, refer to the weight of the total mixture.

Examples 1 to 7

0.05% to 4.0 ppm of the alkane according to the invention was applied to an aromatic polycarbonate consisting of 2,2-bis(4-hydroxyphenyl) propane ($\eta$rel=1.293) with phenol as chain terminator, which was then melted at 280° C. on a twin roll extruder (ZSK 32/2) with vacuum venting. Alternatively the additive according to the invention, optionally together with other additives, was metered directly into the polycarbonate melt. The extruded moulding composition strand was cooled and pelletised. The pellets were dried in a vacuum drying cabinet at 80° C. for 24 h and extruded in an injection moulding machine at a melt temperature of 300° C. to form a workpiece having always the same axial symmetry at a mould temperature of 100° C. The coefficients of friction for static and sliding friction, which were taken as a measure of the releasing action, are then determined from the force that is needed to eject the moulding or to turn the moulding in the mould. Lower values are therefore more advantageous than high values.

Experiments 1 to 5: Release experiments in the 0.05% release agent range, as is conventionally used in CDs

| Experiment | | 1 | 2 | 3 | 4 | 5 |
|---|---|---|---|---|---|---|
| Polycarbonate $\eta$rel = 1.193 | % | 100 | 99.95- | 99.95- | 99.95- | 99.95- |
| Release agent I | % | — | 0.050 | — | — | — |
| Release agent II | % | — | — | 0.050 | — | — |
| Aliphatic compound A | % | — | — | — | 0.050 | — |
| Aliphatic compound A (reproduction) | % | — | — | — | — | 0.050 |

| Experiment | | 1 | 2 | 3 | 4 | 5 |
|---|---|---|---|---|---|---|
| Determination of the coefficients of friction | | | | | | |
| Coefficient of static friction | N/mm$^2$ | 1.15 | 0.62 | 1.17 | 0.77 | 0.70 |
| Coefficient of sliding friction | N/mm$^2$ | 0.84 | 0.67 | 0.93 | 0.76 | 0.73 |

Release agent I: Comparison: Very good release agent of the prior art but with high interesterification activity (GMS= glycerol monostearate)

Release agent II: Comparison: Good release agent of the prior art but with lower interesterification activity (PETS= pentaerythritol tetrastearate)

Aliphatic compound A: According to the invention; hexamethyl tetracosane, "squalane"

As the experiments show, the release agent according to the invention, hexamethyl tetracosane or "squalane", is a very effective release agent at concentrations of around 500 ppm, such as are conventionally used for example in moulding compositions for optical data stores, in other words CDs and DVDs.

Experiments to produce CDs in a pilot plant

CDs were produced in a pilot plant from the above moulding compositions according to the invention from experiments 4 and 5 on a CD mould with a cycle time of 4 sec and a melt temperature of 320° C.

No release problems, deposits or other faults were determined.

Experiments 6 to 12: Release experiments in the 0.1% to 0.4% release agent range, as is conventionally used for injection moulding.

| Experiment | | 6 | 7 | 8 | 9 | 10 | 11 | 12 |
|---|---|---|---|---|---|---|---|---|
| Polycarbonate ηrel = 1.293 | % | 100 | 99.8 | 99.8 | 99.9 | 99.8 | 99.7 | 99.6 |
| Release agent I | % | | 0.2 | | | | | |
| Release agent II | % | | | 0.2 | | | | |
| Aliphatic compound A | % | | | | 0.1 | | | |
| Aliphatic compound A | | | | | | 0.2 | | |
| Aliphatic compound A | | | | | | | 0.3 | |
| Aliphatic compound A | | | | | | | | 0.4 |
| Determination of the coefficients of friction | | | | | | | | |
| Coefficient of static friction | | 0.97 | 0.32 | 0.47 | 0.64 | 0.56 | 0.50 | 0.49 |
| Coefficient of sliding friction | | 0.73 | 0.39 | 0.58 | 0.65 | 0.58 | 0.50 | 0.49 |

Key as for examples 1–5

The experiments confirm that the release agent according to the invention, hexamethyl tetracosane or "squalane", is also a very effective release agent at concentrations of around 1000 to 4000 ppm, such as are conventionally used for example in moulding compositions for injection moulded articles or semi-finished products produced by extrusion, such as, for example, headlamp diffusers and glazing sheets for cars, sheets, films, lamps, housings (e.g. for computers).

What is claimed is:

1. Polycarbonate moulding compositions containing hydrocarbons with 15 to 600 carbons, characterized in that these hydrocarbons are contained in quantities of 0.005 to 5.0 wt. % relative to the weight of the entire moulding composition,
   display a proportion by weight of branches of between 5 wt. % and 30 wt. % relative to the carbons in the chain, and wherein the hydrocarbons contain hydrogenated isoprene units.

2. Polycarbonate moulding compositions according to claim 1, characterised in that they contain 0.01 to 2.0 wt. % of hydrocarbons.

3. Polycarbonate moulding compositions according to claim 1, wherein the hydrocarbons consist of 15 to 100 carbon atoms.

4. Polycarbonate moulding compositions according to claim 1, characterised in that in addition to the hydrogenated isoprene units they also contain hydrogenated 2,3-dimethyl butadiene, hydrogenated butadiene, hydrogenated propene and/or hydrogenated isobutene, in the range from 0–50 mol % (relative to the isoprene units).

5. Polycarbonate moulding compositions according to claim 1, wherein the hydrocrabons consist of 15, 20, 25, 30, 35 or 40 C atoms or are mixtures of the above hydrocarbons.

6. Polycarbonate moulding compositions according to claim 1 further comprising at least one of heat stabilisers, UV/IR stabilisers, other release agents, flame retardants, antidripping agents, lubricants, flow promoters, fillers, colorants, glass fibres, fillers and blend components.

7. Moulding compositions according to claim 6, wherein the polycarbonates used are those based on at least one of 4,4'-dihydroxydiphenyl, 1,1-bis(4-hydroxyphenyl) phenyl ethane, 2,2-bis(4-hydroxyphenyl) propane, 2,2-bis(3,5-dimethyl-4-hydroxyphenyl) propane, 1,1-bis(4-hydroxyphenyl)-m/p-diisopropyl benzene, 1,1-bis(4-hydroxyphenyl) cyclohexane and 1,1-bis(4-hydroxyphenyl)-3,3,5-trimethyl cyclohexane.

8. Moulding compositions according to claim 6 characterised in that the polycarbonates used are those based on 2,2-bis(4-hydroxyphenyl) propane and/or 1,1-bis(4-hydroxyphenyl)-3,3,5-trimethyl cyclohexane and/or 1,1-bis (4-hydroxyphenyl)-m/p-diisopropyl benzene.

9. Mouldings produced from the moulding compositions according to claim 1.

10. A thermoplastic molding composition comprising polycarbonate resin and 0.005 to 5.0% relative to the weight of the composition of at least one hydrocarbon in the form of $C_{15-600}$-methyl-branched alkane wherein the weight proportion of the branches is 10 to 30 percent relative to the weight of carbons in the alkane chain and wherein the hydrocarbons contain hydrogenated isoprene units.

11. The polycarbonate molding composition according to claim 10 wherein said hydrocarbon is present in an amount of 0.01 to 2.0% relative to the weight of the composition.

12. The polycarbonate molding composition according to claim 10 wherein said hydrocarbon is in the form of $C_{15-100}$-methyl-branched alkane.

13. The polycarbonate molding composition according to claim 10 wherein said hydrocarbon is squalane.

14. The polycarbonate molding composition according to claim 10 wherein the polycarbonate is based on at least one member selected from the group consisting of 4,4'- dihydroxydiphenyl, 1,1-bis(4-hydroxyphenyl) phenyl ethane, 2,2-bis(4-hydroxyphenyl) propane, 2,2-bis(3,5-dimethyl-4-hydroxyphenyl) propane, 1,1-bis(4-hydroxyphenyl)-m/p-diisopropyl benzene, 1,1-bis(4-hydroxyphenyl) cyclohexane and 1,1-bis(4-hydroxyphenyl)-3,3,5-trimethyl cyclohexane.

15. The polycarbonate molding composition according to claim 10 wherein the polycarbonate is based on at least one member selected from the group consisting of 2,2-bis(4-hydroxy-phenyl) propane, 1,1-bis(4-hydroxyphenyl)-3,3,5-trimethyl cyclohexane and 1,1-bis(4-hydroxyphenyl)-m/p-diisopropyl benzene.

16. A molded article comprising the composition of claim 10.

* * * * *